United States Patent
Ginthoer et al.

(10) Patent No.: US 12,464,554 B2
(45) Date of Patent: Nov. 4, 2025

(54) METHOD OF PROCESSING DATA RELATED TO A TRANSMISSION OF A PLURALITY OF DATA STREAMS

(71) Applicant: Robert Bosch GmbH, Stuttgart (DE)

(72) Inventors: David Osamu Ginthoer, Stuttgart (DE); Rene Guillaume, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 752 days.

(21) Appl. No.: 17/751,879

(22) Filed: May 24, 2022

(65) Prior Publication Data

US 2022/0386323 A1 Dec. 1, 2022

(30) Foreign Application Priority Data

May 27, 2021 (EP) .................................... 21176111

(51) Int. Cl.
*H04W 72/543* (2023.01)
(52) U.S. Cl.
CPC ................................ *H04W 72/543* (2023.01)
(58) Field of Classification Search
CPC ........... H04W 72/543; H04W 72/1263; H04W 72/0446; H04B 7/0617; H04B 7/063
See application file for complete search history.

(56) References Cited

U.S. PATENT DOCUMENTS

| | | | |
|---|---|---|---|
| 2008/0009322 A1 | 1/2008 | Kim | |
| 2012/0134267 A1* | 5/2012 | Noriega | H04W 72/543 370/230 |
| 2017/0251489 A1* | 8/2017 | Caretti | H04W 72/541 |
| 2019/0253106 A1 | 8/2019 | Raghavan et al. | |
| 2020/0036490 A1 | 1/2020 | Qian et al. | |
| 2022/0304010 A1* | 9/2022 | Han | H04W 72/23 |
| 2023/0189309 A1* | 6/2023 | Ying | H04W 72/51 |

OTHER PUBLICATIONS

"5G; Study on Channel Model for Frequencies From 0.5 to 100 GHz (3GPP TR 38.901 Version 16.1.0 Release 16," European Telecommunications Standards Institute (ETSI), 2020, pp. 1-103 <https://www.etsi.org/deliver/etsi_tr/138900_138999/138901/16.01.00_60/tr_138901v160100p.pdf> Downloaded May 23, 2022.

* cited by examiner

*Primary Examiner* — Ricky Q Ngo
*Assistant Examiner* — Kabir U Jahangir
(74) *Attorney, Agent, or Firm* — NORTON ROSE FULBRIGHT US LLP

(57) ABSTRACT

A method, for example computer implemented method, of processing data related to a transmission of a plurality of data streams, for example data streams of a time sensitive networking, TSN, network, over a wireless communications network, including: determining requirements of at least two data streams of the plurality of data streams, determining a resource demand characterizing transmission resources of the wireless communications network based on the requirements of the at least two data streams, scheduling resources for the at least two data streams based on the resource demand and a correlation between respective radio channels associated with a respective one of the at least two data streams.

19 Claims, 7 Drawing Sheets

METHOD OF PROCESSING DATA RELATED TO A TRANSMISSION OF A PLURALITY OF DATA STREAMS

CROSS REFERENCE

The present application claims the benefit under 35 U.S.C. § 119 of European Patent Application EP 21 17 6111.9 filed on May 27, 2021, which is expressly incorporated herein by reference in its entirety.

FIELD

The present invention relates to a method of processing data related to a transmission of a plurality of data streams.

The present invention further relates to an apparatus for processing data related to a transmission of a plurality of data streams.

BACKGROUND INFORMATION

Exemplary embodiments of the present invention relate to a method, for example a computer implemented method, of processing data related to a transmission of a plurality of data streams, for example data streams of a time sensitive networking, TSN, network, over a wireless communications network, comprising: determining requirements of at least two data streams of the plurality of data streams, determining a resource demand characterizing transmission resources of the wireless communications network based on the requirements of the at least two data streams, scheduling resources for the at least two data streams based on the resource demand and a correlation between respective radio channels associated with a respective one of the at least two data streams.

In other words, in some embodiments, a first data stream of the at least two data streams may be associated with a first radio channel, and a second data stream of the at least two data streams may be associated with a second radio channel, and, in some embodiments, a correlation between the first and second radio channel may be considered for the scheduling of resources for the at least two data streams. In some embodiments, this may enable to increase a reliability of the transmission of the data streams.

In some embodiments of the present invention, the requirements of the plurality of data streams comprise at least one of: a) a cycle time, b) a reliability target, c) a packet error tolerance, for example characterized by a survival time, d) a latency, for example maximum latency, e) jitter, for example maximum jitter, f) packet size, e.g. of data packets.

In some embodiments of the present invention, the wireless communications network may e.g. be a wireless communications network of the fifth generation, 5G, type. In some embodiments, other types may also be used.

In some embodiments of the present invention, the data streams may be transmitted between endpoints of the TSN network, which may e.g. be connected to a logical 5G TSN bridge via TSN bridges each.

According to some exemplary embodiments of the present invention, the method comprises: determining the correlation between the respective radio channels based on a) a respective channel model for the respective radio channels, and/or based on b) a position of devices, for example the endpoints, associated with the at least two data streams, wherein the method, optionally, further comprises: using the correlation for the scheduling.

According to some exemplary embodiments of the present invention, the method comprises: determining if the correlation between respective radio channels associated with a respective one of the at least two data streams exceeds a first threshold, and, if the correlation between respective radio channels associated with a respective one of the at least two data streams exceeds the first threshold, assigning different resources, for example different time resources, to the at least two data streams. This way, the transmission of the at least two data streams over the wireless communications network may be more resilient e.g. in cases of rapidly changing radio channel conditions, because data streams having—at least to some extent—correlated radio channels may be less affected by the rapid changes if they are assigned to different, e.g. time, resources.

According to some exemplary embodiments of the present invention, the method comprises: determining requirements of the plurality of data streams, optionally determining time resources, for example transmission time windows, for example based on the requirements, determining a resource demand characterizing transmission resources of the wireless communications network based on the requirements of the plurality of data streams, for example for different channel states of respective radio channels associated with a respective one of the plurality of data streams, determining a channel model, for example for each of the plurality of data streams, and a correlation between the respective radio channels associated with a respective one of the plurality of data streams, for example based on the channel models, scheduling resources for the plurality of data streams based on the resource demand and the correlation.

In some exemplary embodiments of the present invention, a channel model for a data stream, for example for each data stream, may be retrieved or determined in multiple ways.

In some exemplary embodiments of the present invention, one property which may be utilized by means of the channel model is a correlated nature of the data streams and/or devices associated with the data streams, e.g. endpoints, e.g. being positioned in proximity to each other. In some exemplary embodiments, endpoints or users close to each other may experience similar large-scale channels effects of their radio channels.

As an example, an automated guided vehicle (AGV) in a factory hall may be considered that transports large metallic goods. In this process, it may randomly block Line-of-Sight (LOS) connection of different users (e.g., user equipment connected to an endpoint of a TSN network) that may be close together and may thus be jointly affected by the degradation of the LOS conditions. As a result of the impaired channel quality, in conventional approaches, all affected users or endpoints may require more robust modulation and coding schemes, and hence more transmission resources, such as e.g. radio resource blocks, RB, e.g., characterizing time and frequency transmission resources, e.g. to maintain successful delivery of data frames under the poor channel conditions. While this effect may not be avoided in conventional approaches, according to some exemplary embodiments, a schedule for transmission of the data streams may be determined which may reduce e.g. the effects of a sudden spike in a RB demand, e.g. at a single transmission time window.

In some exemplary embodiments of the present invention, one option for modeling the radio channel, for example its correlative behavior, may be to observe the radio channel and/or an amount of (e.g., required) resources to transmit a packet over a longer period of time (which, in some embodiments, may depend directly on the radio channel), for example of some or all data streams and/or the respective device(s) (for example endpoints) associated with the data streams, for example over a period of time.

In some exemplary embodiments of the present invention, based on this observation, a probability of different channel states and a correlation between different data streams or their associated radio channels, respectively, can be determined.

In some exemplary embodiments of the present invention, learning algorithms, for example more sophisticated learning algorithms, may be used, where a prediction of the channel model based on training data and/or other parameters such as e.g. a position and/or a mobility of the device, e.g. endpoint, may be taken into consideration.

In some exemplary embodiments of the present invention, one or more different stochastic models may be used, which for example describe different effects in a radio channel. In some exemplary embodiments, for example when trying to optimize a pre-schedule of resources for the transmission of the data streams, e.g. over longer periods of time, large scale effects may be considered by the stochastic model(s). As an example, in some embodiments, radio channel models may be used which characterize a path loss and/or shadowing effects, for example similar to and/or based on 3GPP, "TS 38.901 V16.1.0 Study on channel model for frequencies from 0.5 to 100 GHz,", 2020.

In some exemplary embodiments of the present invention, the radio channel associated with the data streams, for example all data streams, or endpoints, respectively, may be modeled, for example via a location-dependent path loss $L_p(\Delta(gNB,d))$, for example between a network element, such as e.g. a base station, e.g. gNB, and a device d, such as e.g. a user equipment or endpoint, and/or via a random shadowing attenuation $L_s$, which in some embodiments may be modelled as a Gaussian random variable, for example with zero mean and a, for example, environment-specific standard deviation. In some embodiments, a value of $\sigma=7.2$ may be used for indoor factory environments, as, e.g., mentioned in TS 38.901 V16.1.0.

In some exemplary embodiments of the present invention, a location-specific shadowing may be considered, i.e. the shadowing may be correlated between users or endpoints given their relative position $\delta$ to each other: $\rho=\exp(-\delta(dk, dl)/dcor)$, where dcor is a decorrelation factor, which, in some embodiments, may, e.g., be 10 m for a same indoor factory environment. In other words, in some embodiments, this model may describe that devices in proximity may experience a similar channel quality.

In some exemplary embodiments of the present invention, the scheduling comprises optimizing an assignment of time resources to the plurality of data streams such that a number of required resources, for example time and/or frequency resources, for a set of streams assigned to a same time resource, for example time window, is minimized.

In some exemplary embodiments of the present invention, the optimization may aim at minimizing the required resources for several time windows, for example each time window, which, in some embodiments, may lead to an even distribution of required resources in the, for example all, time windows and a minimization of total required resources over all time windows.

In some exemplary embodiments of the present invention, the scheduling comprises minimizing a correlation between at least two, for example all, data streams assigned to a same time resource and/or between their associated radio channels.

In some exemplary embodiments of the present invention, the method comprises: providing a first schedule for the transmission of the at least two data streams of the plurality of data streams, for example an offline pre-schedule, for example based on the scheduled resources, and, optionally, providing a second schedule for the transmission of the at least two data streams of the plurality of data streams, for example an online schedule, for example based on the first schedule, and, optionally, based on channel measurements associated with at least one of the respective radio channels associated with a respective one of the at least two data streams.

In some exemplary embodiments of the present invention, the method comprises: providing the first schedule to the wireless communications network and/or to an element of the wireless communications network, e.g. for facilitating resource planning, and, optionally, receiving feedback from the wireless communications network and/or the element of the wireless communications network on the first schedule, and, optionally, modifying at least one of the first schedule and the second schedule based on the feedback. This way, in some embodiments, the first schedule may be modified, e.g. further optimized, based on the feedback from the wireless communications network.

Further exemplary embodiments of the present invention relate to a method of operating an element of a wireless communications network, comprising: receiving a first schedule, for example an offline pre-schedule, for a transmission of at least two data streams of a plurality of data streams, for example of a time sensitive networking, TSN, network, over the wireless communications network, and, optionally, providing feedback on the first schedule.

Further exemplary embodiments of the present invention relate to an apparatus for performing the method according to the embodiments.

In some embodiments of the present invention, the apparatus may e.g. be provided in and/or for a network element of a, for example TSN, network, and/or in and/or for a network element of a wireless communications system or network, e.g. of the 5G type.

Further exemplary embodiments of the present invention relate to a computer program comprising instructions which, when the program is executed by a computer, cause the computer to carry out the method according to the embodiments.

Further exemplary embodiments of present invention relate to a computer-readable storage medium comprising instructions which, when executed by a computer, cause the computer to carry out the method according to the embodiments.

Further exemplary embodiments of the present invention relate to a data carrier signal carrying and/or characterizing the computer program according to the embodiments.

Further exemplary embodiments of the present invention relate to a communications network, for example time sensitive networking network and/or wireless communications network, comprising at least one apparatus according to the embodiments.

Further exemplary embodiments of the present invention relate to a use of the method according to the embodiments and/or of the apparatus according to the embodiments and/or of the computer program according to the embodiments and/or of the computer-readable storage medium according to the embodiments and/or of the data carrier signal according to the embodiments and/or of the communications network according to the embodiments for at least one of: a) reducing, for example minimizing, an amount of overprovisioned resources, for example for transmission of the data streams, b) increasing a number of, for example time critical, data streams which can be supported, for example by the wireless communications network, c) scheduling resources for at least two data streams based on a correlation between respective radio channels associated with a respective one of the at least two data streams, d) optimizing a first schedule, for example an offline pre-schedule, for transmitting data streams, for example using a time sensitive networking, TSN, network and/or a wireless communications network, for example a joint TSN and wireless communications system, e) increasing a reliability for transmission of the data streams, for example in a system with limited share resources, f) minimizing required resources to achieve a predetermined reliability target, g) determining a reliable, e.g. the most reliable, schedule for a transmission of the data streams, for example under a resource constraint, h) avoiding to assign resources for a transmission of the data streams on a per-stream basis, i) assigning resources for a transmission of the data streams based on groups of the data streams, for example optimizing the groups of the data streams such that a channel correlation of radio channels associated with the data streams is minimized between all data streams using a same set of resources, for example same time resources, for example a same time window.

BRIEF DESCRIPTION OF THE FIGURES

Some exemplary embodiments of the present invention will now be described with reference to the figures.

Brief Description of the Drawings

Figure 1:
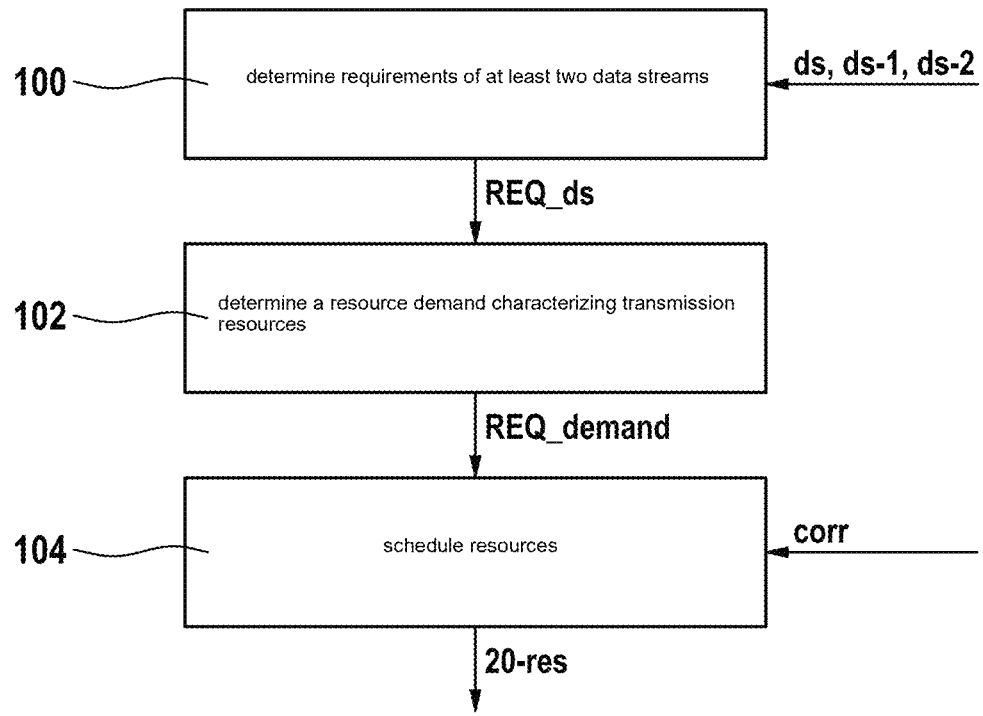

FIG. 1 schematically depicts a simplified flow chart according to exemplary embodiments of the present invention.

Figure 2:
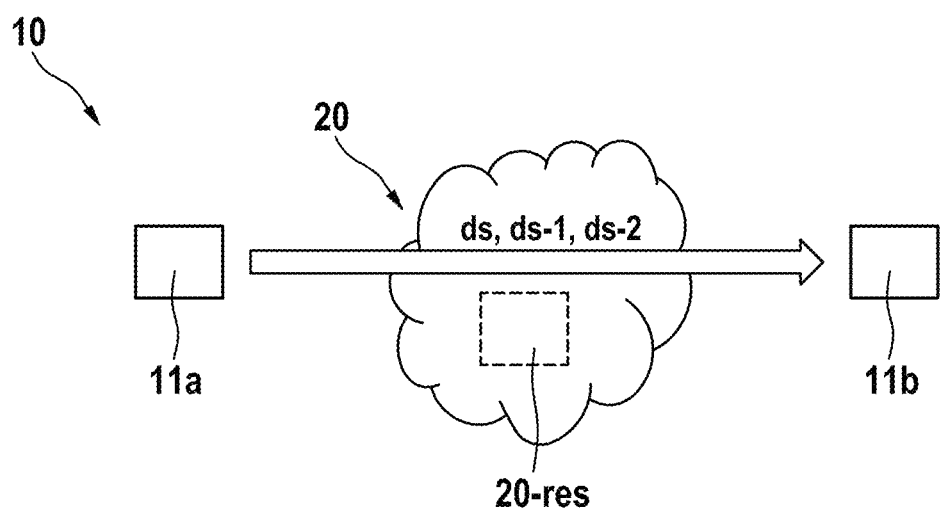

FIG. 2 schematically depicts a simplified block diagram according to exemplary embodiments of the present invention.

Figure 3:
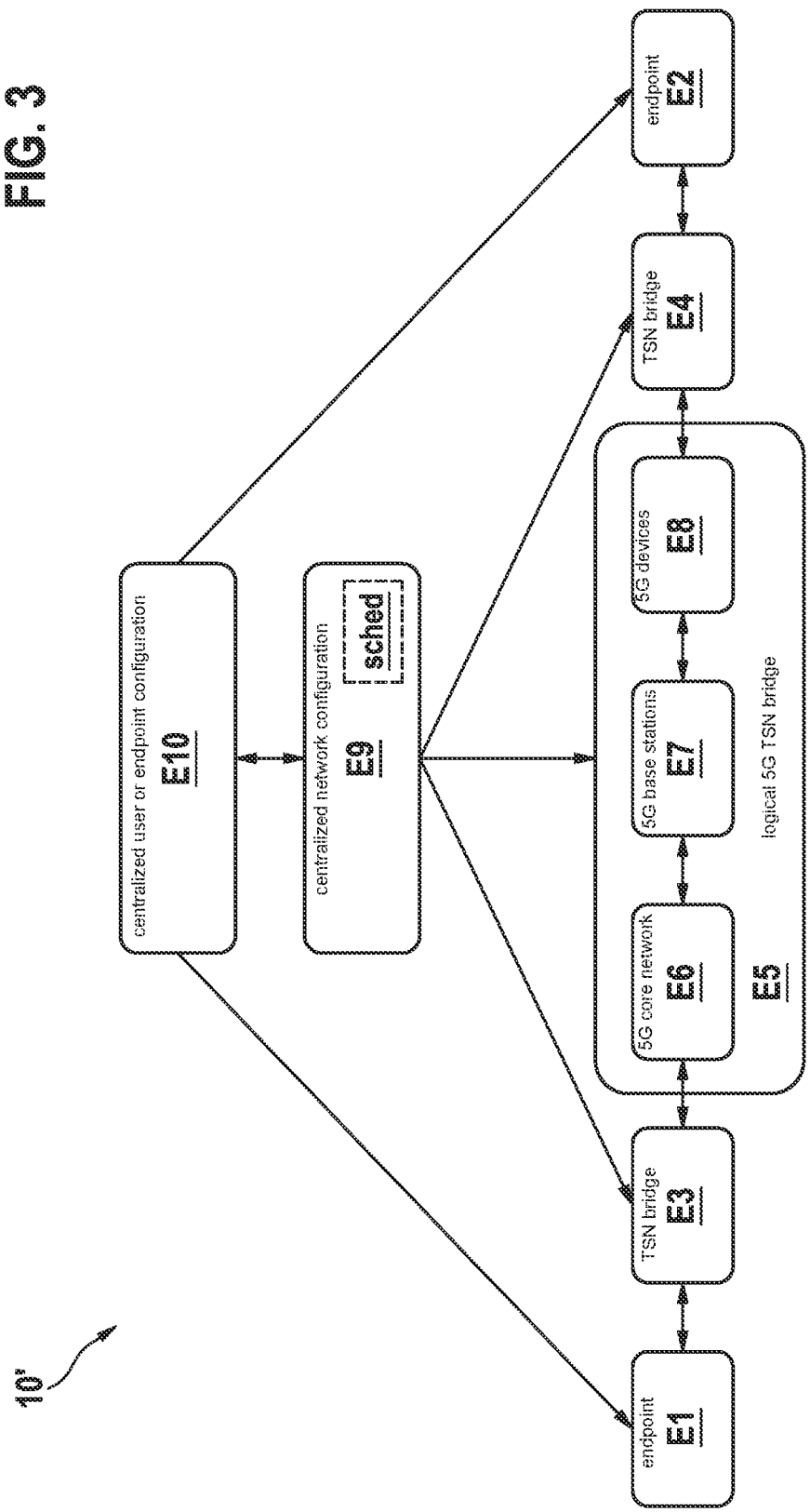

FIG. 3 schematically depicts a simplified block diagram according to exemplary embodiments of the present invention.

Figure 4:
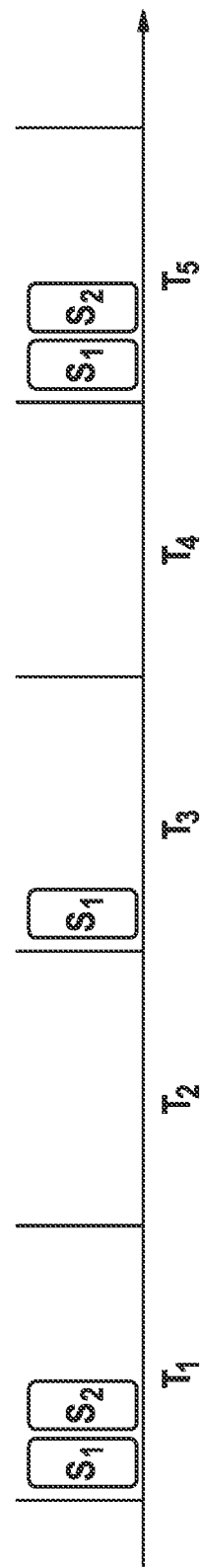

FIG. 4 schematically depicts a simplified time diagram according to exemplary embodiments of the present invention.

Figure 5:
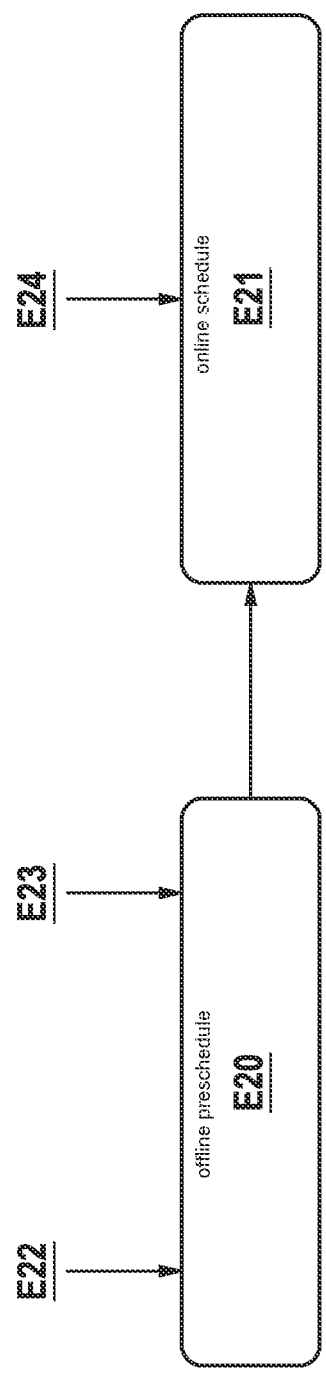

FIG. 5 schematically depicts a simplified block diagram according to exemplary embodiments of the present invention.

Figure 6:
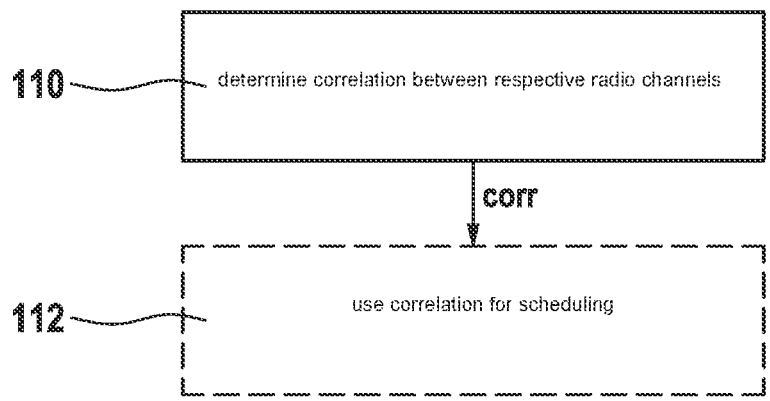

FIG. 6 schematically depicts a simplified flow-chart according to exemplary embodiments of the present invention.

Figure 7:
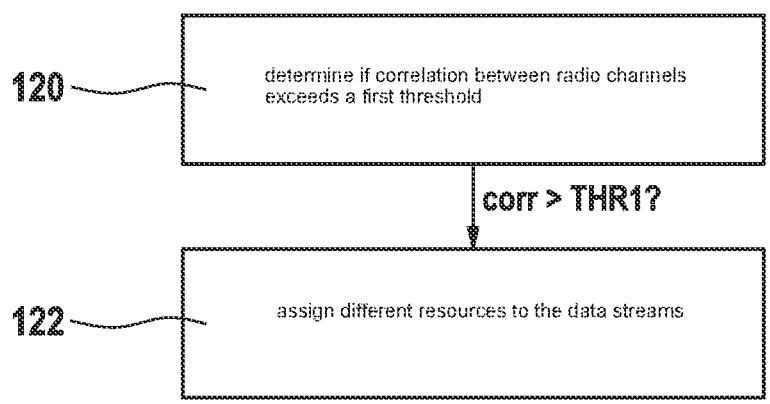

FIG. 7 schematically depicts a simplified flow-chart according to exemplary embodiments of the present invention.

Figure 8:
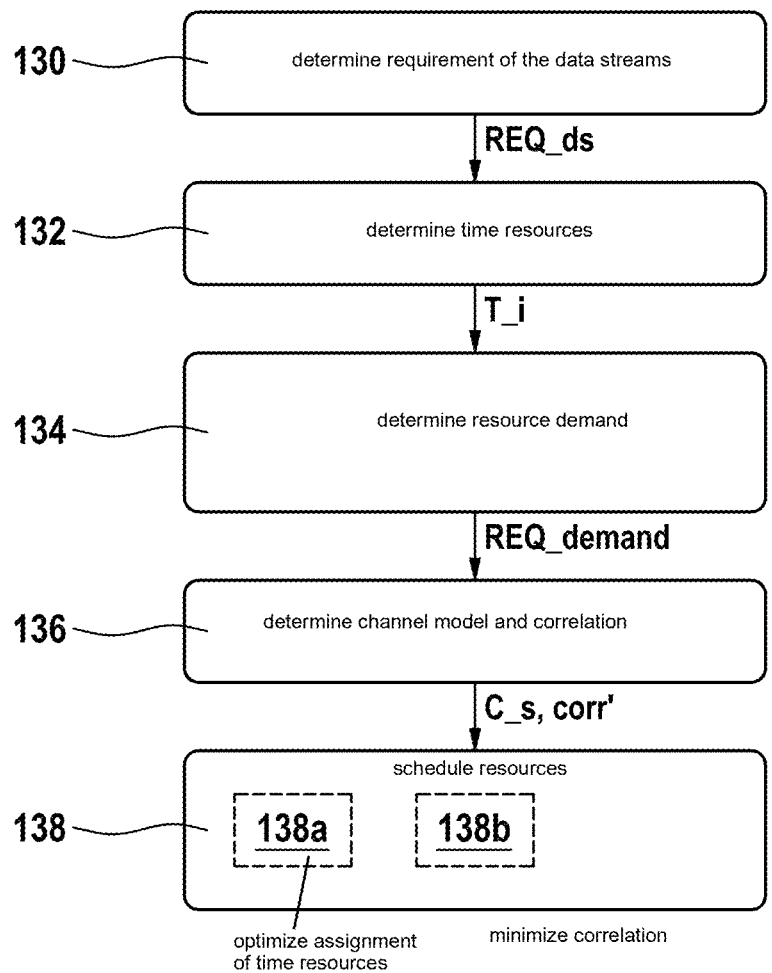

FIG. 8 schematically depicts a simplified flow-chart according to exemplary embodiments of the present invention.

Figure 9:
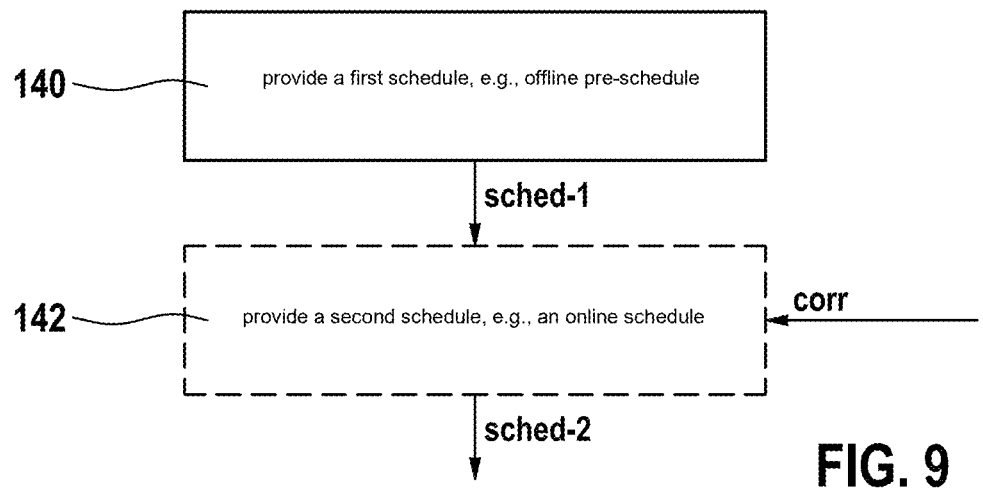

FIG. 9 schematically depicts a simplified flow-chart according to exemplary embodiments of the present invention.

Figure 10:
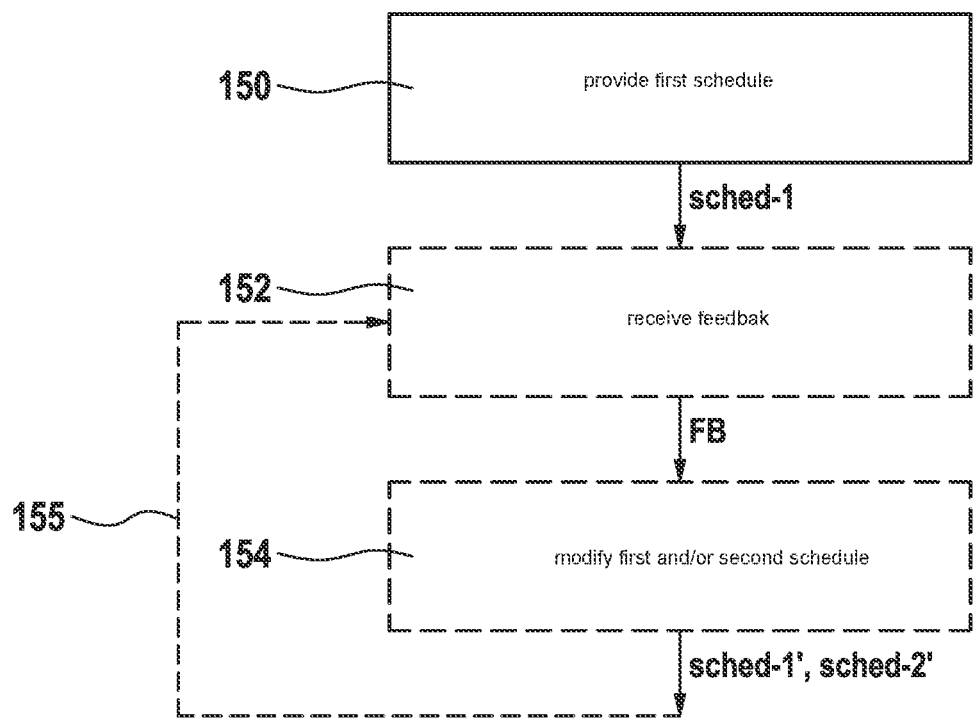

FIG. 10 schematically depicts a simplified flow-chart according to exemplary embodiments of the present invention.

Figure 11:
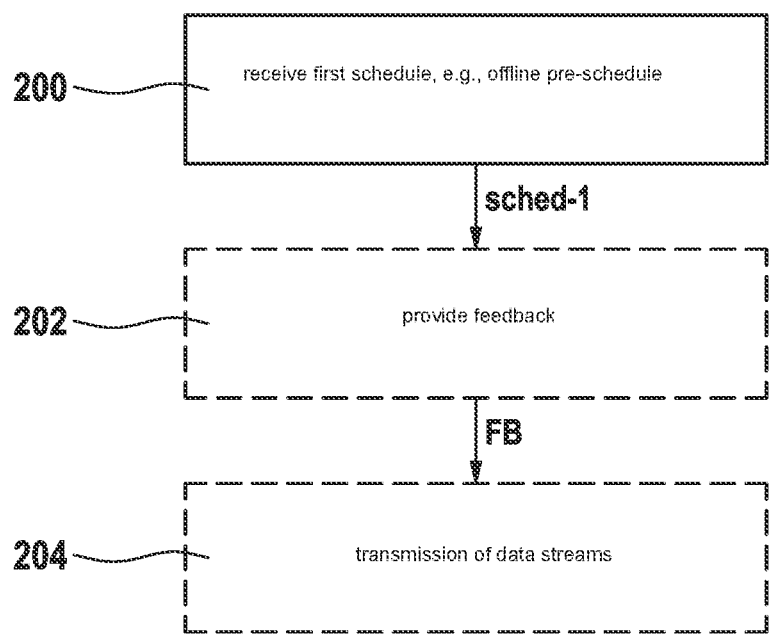

FIG. 11 schematically depicts a simplified flow-chart according to exemplary embodiments of the present invention.

Figure 12:
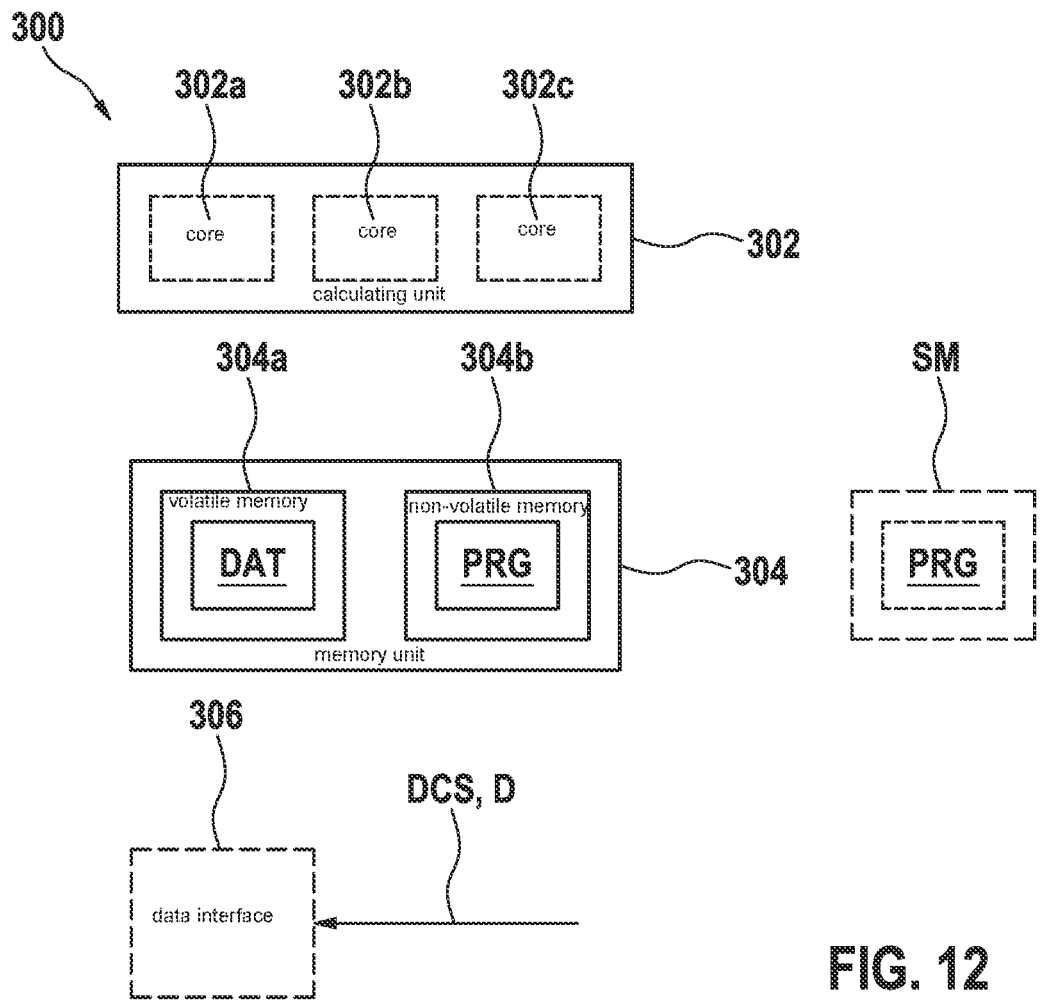

FIG. 12 schematically depicts a simplified block diagram according to exemplary embodiments of the present invention.

Figure 13:
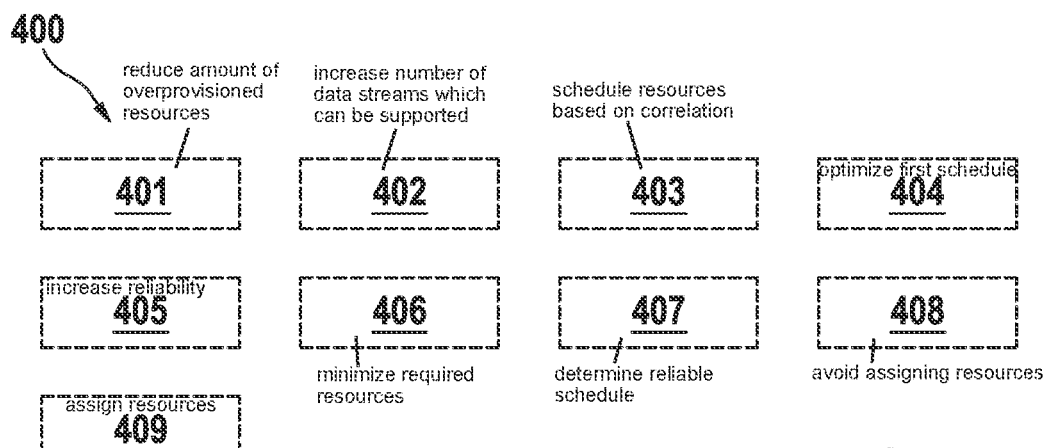

FIG. 13 schematically depicts exemplary aspects of use according to exemplary embodiments of the present invention.

DETAILED DESCRIPTION OF EXAMPLE EMBODIMENTS

Exemplary embodiments, see for example FIG. 1, 2, relate to a method, for example a computer implemented method, of processing data related to a transmission of a plurality of data streams ds (FIG. 2), for example data streams ds of a time sensitive networking, TSN, network 10, over a wireless communications system 20, comprising: determining 100 (FIG. 1) requirements REQ_ds of at least two data streams ds-1, ds-2 of the plurality of data streams ds, determining 102 a resource demand RES_demand characterizing transmission resources (FIG. 2) of the wireless communications system 20 based on the requirements REQ_ds of the at least two data streams ds-1, ds-2, scheduling 104 (FIG. 1) resources 20-res for the at least two data streams ds-1, ds-2 based on the resource demand RES_demand and a correlation corr between respective radio channels associated with a respective one of the at least two data streams ds-1, ds-2. In some embodiments, this may enable to increase a reliability of the transmission of the data streams ds-1, ds-2.

In some embodiments, the requirements REQ_ds of the plurality of data streams ds comprise at least one of: a) a cycle time, b) a reliability target, c) a packet error tolerance, for example characterized by a survival time, d) a latency, for example maximum latency, e) jitter, for example maximum jitter, f) packet size, e.g., of data packets.

In some embodiments, the wireless communications system 20 (FIG. 2) may e.g. be a wireless communications network of the fifth generation, 5G, type.

In some embodiments, the data streams ds, ds-1, ds-2 may be transmitted between endpoints 11a, 11b of the TSN network 10, which may e.g. be connected to a logical 5G TSN bridge via TSN bridges each. This is exemplarily depicted by the simplified block diagram of FIG. 3, wherein elements E1, E2 symbolize endpoints of the TSN network 10', e.g. similar to the endpoints 11a, 11b of the TSN network 10 of FIG. 2. Further, elements E3, E4 of FIG. 3 symbolize respective TSN bridges connecting the endpoints E1, E2 to a logical 5G TSN bridge E5 e.g. comprising a 5G core network E6, one or more 5G base stations E7, for example gNBs, and one or more 5G devices E8.

Element E9 of FIG. 3 symbolizes a centralized network configuration according to some exemplary embodiments, and element E10 symbolizes a centralized user or endpoint configuration according to some exemplary embodiments. In some embodiments, the devices E9, E10 may configure and/or schedule devices or components 11a, 11b of the network 10'.

In some embodiments, deterministic applications are considered, where one or more, or all, data streams ds between two endpoints 11a, 11b, E1, E2 exhibit a periodic data exchange of constant size. In some embodiments, a goal may be to determine a suitable first (TSN) (e.g., pre-) schedule, e.g. by a centralized configuration, wherein the first schedule reserves necessary resources in each network element involved in the transmission of the data streams, for example such that a reliability requirement of each data stream is met.

Due to a static nature of wired, for example Ethernet-based, TSN networks, in some embodiments, the TSN pre-schedule may be executed precisely without frame errors between the TSN Bridges E3, E4. Apart from e.g. device failures, in some embodiments it may be guaranteed that each time slot offers the same bandwidth to each data stream ds, ds-1, ds-2 in every cycle. In some embodiments, this may, however, not be the case on wireless links implemented using the wireless communications system 20, e.g. the 5G bridge E5 of FIG. 3, where in some embodiments unpredictable dynamics may influence information rate and reliability. In view of this, exemplary embodiments focus on a scheduling of the Logical 5G TSN Bridge E5.

Some exemplary embodiments aim at maintaining a sufficiently high schedulability probability throughout operation of the network for at least two, or, for example, all, data streams ds. To this end, in some embodiments, a scheduler sched, which may e.g. be provided in the centralized network configuration E9 of FIG. 3, may determine at which point in time which endpoint E1, E2 should transmit its data and how much resources must be reserved for the respective data stream, for example in or by the Logical 5G TSN Bridge E5.

In some exemplary embodiments, the centralized network configuration E9 may forward stream requirements, e.g. from and/or associated with E1 and E2, and, for example, expected arrival time(s) of frames at E5 to E5. In some exemplary embodiments, element E5 may then determine, for example internally, for example based on a criticality of the stream, if and how much resources should be given priority access to the stream.

Exemplary aspects of a proposed scheduling procedure of the Logical 5G TSN Bridge E5 (FIG. 3) according to further exemplary embodiments are depicted by FIG. 4. In some embodiments, the scheduler sched (FIG. 3) may gather, for example all, relevant requirements R(s) about the at least two data streams ds-1, ds-2, or about each data stream ds, such as e.g. cycle time, reliability target, packet error tolerance (e.g. survival time), latency, etc.

In some embodiments, optionally, the scheduler sched may determine a suitable number of fixed transmission time windows Ti, during which the data streams ds may transmit data frames, see for example the exemplary time windows $T_1, T_2, T_3, T_4, T_5$ of FIG. 4 and the rounded rectangles $S_1, S_2$ symbolizing frames associated with data streams.

In some exemplary embodiments, a first data stream 1 may e.g. consist of or may comprise frames S1. In some exemplary embodiments, for example every odd time window Ti, a new frame S1 may be generated by data stream 1. In some exemplary embodiments, a pre-schedule may comprise the information "schedule frame S1 to time window Ti". In some exemplary embodiments, frames, for example all frames, scheduled to the time window Ti, may end up in an arbitrary order (e.g., the order of arrival) within the time window Ti and may occupy a time resource according to the rounded rectangles' size as symbolized by FIG. 4.

In some embodiments, such determination of a suitable number of fixed transmission time windows is not required, as the scheduler sched may e.g. basically determine freely when each frame is eligible to be transmitted. However, in some embodiments, having fixed cycles may reduce the computational complexity of finding a schedule.

A general procedure of finding eligible schedules for the transmission of data streams as such, e.g., in TSN networks 10, 10', is conventional in the related art. In FIG. 4, an exemplary choice of Ti and two data streams with cycle times $S_1'=2Ti$ and $S_2=4Ti$ is shown.

In some embodiments, a first or offline schedule, which may also be denoted as pre-schedule, e.g. determined prior to a start of the data transmission over the TSN network 10, 10', may e.g. remain valid throughout an operation of the TSN network, wherein for example each data stream considered in the pre-schedule is bound to its transmission window(s).

In some embodiments of the present invention, additionally, a scheduler of the wireless communications system 20 may e.g. make adjustments, for example fine adjustments, for example within the pre-schedule (e.g. characterized by an assignment of frame(s) to time window(s) Ti, e.g. by distributing resources such as resource blocks, e.g. within a respective time window Ti), for example based on an actual experienced radio channel, for example if the jitter and latency requirements allow for it (e.g. precise resource allocation). This is exemplarily symbolized by FIG. 5, wherein element E20 symbolizes an offline pre-schedule, e.g. assigning data streams ds to transmission time windows, wherein element E21 symbolizes an online schedule, e.g. within single transmission time windows $T_i$. Element E22 symbolizes optional channel and correlation models which may be used for the pre-schedule E20 in some embodiments, and element E23 symbolizes the stream requirements which may be used for the pre-schedule E20 in some embodiments. Element E24 symbolizes channel measurements, e.g. related to the actual experienced radio channel, which may be used for the online schedule E21 in some embodiments.

In some exemplary embodiments of the present invention, the offline pre-schedule E20 may be determined, e.g. once, e.g. prior to a transmission of data streams and/or before the network is operational. In some exemplary embodiments of the present invention, the online schedule E21 may be determined repeatedly, for example periodically and/or continuously.

In some exemplary embodiments, the online schedule E21 may be determined and/or executed, e.g. in the (5G) network 20, e.g. for each transmission time interval. In some exemplary embodiments, e.g. based on channel measurement E24, a current schedule and a, for example required, number of resources, e.g. resource blocks, may be calculated, e.g. again, e.g. before each transmission.

In other words, in some exemplary embodiments, element E20 characterizes and/or delivers a single schedule sched-1 that e.g. remains fixed, whereas, in some exemplary embodiments, element E21 characterizes and/or delivers a new schedule sched-2, for example for each time window Ti.

According to some exemplary embodiments, FIG. 6, the method comprises: determining 110 the correlation corr between the respective radio channels based on a) a respective channel model for the respective radio channels, and/or based on b) a position of devices, for example the endpoints 11a, 11b or E1, E2, associated with the at least two data streams ds-1, ds-2 (FIG. 2), wherein the method, optionally, further comprises: using 112 the correlation corr for the scheduling. In some embodiments, block 110 may be performed to provide the correlation to block 104 of FIG. 1.

In some exemplary embodiments, a channel model may be static. In some exemplary embodiments, a channel model may be non-static, for example, dynamic, for example, based on measurements and/or based on empirically determined values.

According to some exemplary embodiments, FIG. 7, the method comprises: determining 120 if the correlation corr between respective radio channels associated with a respective one of the at least two data streams ds-1, ds-2 exceeds a first threshold THR1, and, if the correlation corr between respective radio channels associated with a respective one of the at least two data streams ds-1, ds-2 exceeds the first threshold THR1, assigning 122 different resources, for example different time resources (e.g. different time windows as explained above with respect to FIG. 4), to the at least two data streams ds-1, ds-2. This way, the transmission of the at least two data streams ds-1, ds-2 over the wireless communications system 20 (FIG. 2) may be more resilient e.g. in cases of rapidly changing radio channel conditions.

According to some exemplary embodiments, FIG. 8, the method comprises: determining 130 requirements REQ_ds of the plurality of (e.g., all) data streams ds, optionally, determining 132 time resources T_i, for example transmission time windows, for example based on the requirements REQ_ds, determining 134 a resource demand RES_demand characterizing transmission resources of the wireless communications system 20 based on the requirements REQ_ds of the plurality of data streams ds, for example for different channel states of respective radio channels associated with a respective one of the plurality of data streams ds, determining 136 a channel model C_s, for example for each of the plurality of data streams ds, and a correlation corr' between the respective radio channels associated with a respective one of the plurality of data streams ds, for example based on the channel models C_s, scheduling 138 resources 20-res for the plurality of data streams ds based on the resource demand RES_demand and the correlation corr'.

In some embodiments, in block 134, the resource demand RES_demand may be derived under different channel states c∈C_s. As an example, whether a burst of streams s in a time window Ti can be transmitted, e.g. in the Logical 5G TSN Bridge E5 (FIG. 3), may depend on how many resources, for example resource blocks (RBs) each data stream requires. In some embodiments, the RB demand per data stream may be determined by a transmission scheme, which in some embodiments may be selected based on the requirements of the data stream and a current channel state of the radio channel associated with the data stream.

In some embodiments, in 5G-type wireless communication networks 20, channel states may be partially described by a reported CQI (channel quality indicator), e.g. from each mobile device (which, in turn, may depend on an experienced Signal to Interference and Noise Ratio (SINR)). In some embodiments, a standardized mapping of CQI to a modulation and coding scheme, MCS, e.g. under a given packet error target, may be used to determine a required number of RBs (and thus the abovementioned RB demand), e.g. for a given Transport Block Size (TBS).

In some exemplary embodiments, a channel model for a data stream (see for example block 136 of FIG. 8), for example for each data stream, may be retrieved or determined in multiple ways.

In some exemplary embodiments, one property which may be utilized by means of the channel model C_s is a correlated nature of the data streams ds and/or devices associated with the data streams, e.g. endpoints 11a, 11b, E1, E2, e.g. being positioned in proximity to each other. In some exemplary embodiments, endpoints or users close to each other may experience similar large-scale channels effects of their radio channels.

As an example, an automated guided vehicle (AGV) in a factory hall may be considered that transports large metallic goods. In this process, it may randomly block Line-of-Sight (LOS) connection of different users or endpoints of a TSN network that may be close together and may thus be jointly affected by the degradation of the LOS conditions. As a result of the impaired channel quality, in conventional approaches, all affected users or endpoints may require more robust modulation and coding schemes, and hence more transmission resources, such as e.g. radio resource blocks, RB, e.g. characterizing time and frequency transmission resources, e.g. to maintain successful delivery of data frames under the poor channel conditions. While this effect may not be avoided in some conventional approaches, according to some exemplary embodiments, a schedule for transmission of the data streams may be determined which may reduce e.g. the effects of a sudden spike in a RB demand, e.g. at a single transmission time window.

In some exemplary embodiments, one option for modeling the radio channel, for example its correlative behavior, may be to observe the radio channel, for example of some or all data streams and/or the respective device(s) (for example endpoints) associated with the data streams, for example over a period of time.

In some exemplary embodiments, based on this observation, a probability of different channel states and a correlation between different data streams or their associated radio channels, respectively, can be determined.

In some exemplary embodiments, learning algorithms, for example more sophisticated learning algorithms, may be used, where a prediction of the channel model based on training data and/or other parameters such as e.g. a position and/or a mobility of the device, e.g. endpoint, may be taken into consideration.

In some exemplary embodiments, one or more different stochastic models may be used, which for example describe different effects in a radio channel. In some exemplary embodiments, for example when trying to optimize a pre-schedule of resources for the transmission of the data streams, e.g. over longer periods of time, large scale effects may be considered by the stochastic model(s). As an example, in some embodiments, radio channel models may be used which characterize a path loss and/or shadowing effects, for example similar to and/or based on 3GPP, "TS 38.901 V16.1.0 Study on channel model for frequencies from 0.5 to 100 GHz,", 2020.

In some exemplary embodiments, the radio channel associated with the data streams, for example all data streams, or endpoints, respectively, may be modeled, for example via a location-dependent path loss Lp($\Delta$(gNB,d)), for example between a network element, such as e.g. a base station, e.g. gNB, and a device d, such as, e.g., a user equipment or endpoint, and/or via a random shadowing attenuation Ls, which in some embodiments may be modelled as a Gaussian random variable, for example with zero mean and a, for example, environment-specific standard deviation. In some embodiments, a value of $\sigma=7.2$ may be used for indoor factory environments, as e.g. mentioned in TS 38.901 V16.1.0.

In some exemplary embodiments, a location-specific shadowing may be considered, i.e. the shadowing may be correlated between users or endpoints given their relative position $\delta$ to each other: $\rho=\exp(-\delta(dk,dl)/dcor)$, where dcor is a decorrelation factor, which, in some embodiments, may e.g. be 10 m for a same indoor factory environment. In other words, in some embodiments, this model may describe that devices in proximity may experience a similar channel quality.

In some exemplary embodiments, the scheduling 138 comprises optimizing 138a an assignment of time resources to the plurality of data streams ds such that a number of required resources, for example time and/or frequency resources, for a set of streams assigned to a same time resource, for example time window, is minimized.

In some exemplary embodiments, the scheduling 138 comprises minimizing 138b a correlation between at least two, for example all, data streams assigned to a same time resource and/or between their associated radio channels.

In some embodiments, the scheduler sched (FIG. 3) may e.g. determine an optimal assignment of data streams ds to the time windows ds→Ti, e.g. with the goal to minimize a number of required resources RB_reserved_Ti(D), where D:d(s|s→Ti) is a set of devices (e.g., endpoints) d transmitting data streams ds in time window Ti.

In some embodiments, this can be achieved by minimizing the correlation minρ(dk,dl)∀dk,dl∈d(s|s→Ti) between all devices d in time window Ti. Using the example mentioned above, it can be seen that, in some embodiments, users or endpoints with very similar positions should e.g. not transmit in a same time window. In some embodiments, in case of an obstacle in the communication path used for transmitting the data streams, all streams may be affected simultaneously, hence increasing a resource demand for all data streams at once.

In other words, in some embodiments, by minimizing the correlation, it may become less likely that all data streams ds require a worst-case provision of resources at the same time. In some embodiments, it holds that for a given fixed schedule D:d(s|s→Ti) and two different location constellations Δ1:δ(dk,dl)∀dk,dl∈D and Δ2:δ(dk,dl)∀dk,dl∈D: If Σρ(dk,dl)∀dk,dl∈D, Δ1<Σρ(dk,dl)∀dk,dl∈D, Δ2, then RBreservedTi(D,Δ1)<RBreservedTi(D,Δ2) under the same reliability target.

Hence, the principle according to the embodiments may distribute an occurrence of potential impairments over different time resources, for example time windows Ti. In other words, it may reduce a variance of RB demands over time per time window.

In some exemplary embodiments, FIG. 9, the method comprises: providing 140 a first schedule sched-1 for the transmission of the at least two data streams ds-1, ds-2 of the plurality of data streams ds, for example an offline pre-schedule, for example based on the scheduled resources, and, optionally, providing 142 a second schedule sched-2 for the transmission of the at least two data streams ds-1, ds-2 of the plurality of data streams, for example an online schedule, for example based on the first schedule sched-1, and, optionally, based on channel measurements (and/or respective correlations corr thereof) associated with at least one of the respective radio channels associated with a respective one of the at least two data streams ds-1, ds-2.

In some exemplary embodiments, the offline pre-schedule sched-1 (e.g., similar to element E20 explained above) may be determined, e.g. once, e.g. prior to a transmission of data streams and/or before the network is operational. In some exemplary embodiments, the online schedule sched-2 (e.g., similar to element E21) may be determined repeatedly, for example periodically and/or continuously. This is exemplarily symbolized in FIG. 10 by the dashed arrow 155.

In some exemplary embodiments, the online schedule E21 may be determined and/or executed, e.g. in the (5G) network 20, e.g. for each transmission time interval.

In some exemplary embodiments, FIG. 10, the method comprises: providing 150 the first schedule sched-1 to the wireless communications system 20 and/or to an element of the wireless communications system 20, e.g. for facilitating resource planning, and, optionally, receiving 152 feedback FB from the wireless communications system 20 and/or the element of the wireless communications network on the first schedule sched-1, and, optionally, modifying 154 at least one of the first schedule and the second schedule based on the feedback, wherein modified schedule(s) sched-1', sched-2' may be obtained. This way, in some embodiments, e.g. the first schedule sched-1 may be modified, e.g. further optimized, based on the feedback FB from the wireless communications system 20.

Further exemplary embodiments, FIG. 11, relate to a method of operating an element of a wireless communications system 20, comprising: receiving 200 a first schedule sched-1, for example an offline pre-schedule, for a transmission of at least two data streams ds-1, ds-2 of a plurality of data streams ds, for example of a time sensitive networking, TSN, network 10, over the wireless communications system 20, and, optionally, providing 202 feedback FB on the first schedule sched-1. The optional block 204 symbolizes a transmission of data streams ds via the wireless communications system 20 using the first schedule sched-1 or the modified first schedule sched-1'.

Further exemplary embodiments, FIG. 12, relate to an apparatus 300 for performing the method according the embodiments.

In some embodiments, the apparatus 300 may e.g. be provided in a network element of a, for example TSN, network 10, and/or in a network element of a wireless communications system 20, e.g. of the 5G type.

In some embodiments, the apparatus 300 comprises at least one calculating unit ("computer") 302 having for example one or more cores 302a, 302b, 302c and at least one memory unit 304 associated with (i.e., usable by) said at least one calculating unit 302 for at least temporarily storing a computer program PRG and/or data DAT, wherein said computer program PRG is, e.g., configured to at least temporarily control an operation of said apparatus 300, e.g. the execution of a method according to the embodiments.

In some embodiments, the calculating unit 302 may comprise at least one of the following elements: a microprocessor, a microcontroller, a digital signal processor (DSP), a programmable logic element (e.g., FPGA, field programmable gate array), an ASIC (application specific integrated circuit), hardware circuitry, a tensor processor, a graphics processing unit (GPU). According to further exemplary embodiments, any combination of two or more of these elements is also possible.

In exemplary embodiments, the memory unit 304 comprises at least one of the following elements: a volatile memory 304a, particularly a random-access memory (RAM), a non-volatile memory 304b, particularly a Flash-EEPROM. Preferably, said computer program PRG is at least temporarily stored in said non-volatile memory 304b. Data DAT, which may e.g. be used for executing the method according to the embodiments, may at least temporarily be stored in said RAM 304a.

In exemplary embodiments, an optional computer-readable storage medium SM comprising instructions, e.g. in the form of a computer program PRG, may be provided, wherein said computer program PRG, when executed by a computer, i.e. by the calculating unit 302, may cause the computer 302 to carry out the method according to the embodiments. As an example, the storage medium SM may comprise or represent a digital storage medium such as a semiconductor memory device (e.g., solid state drive, SSD) and/or a magnetic storage medium such as a disk or harddisk drive (HDD) and/or an optical storage medium such as a compact disc (CD) or DVD (digital versatile disc) or the like.

In exemplary embodiments, the apparatus 300 may comprise an optional data interface 306, preferably for bidirectional data exchange D with an external device (not shown).

As an example, by means of said data interface 306, a data carrier signal DCS may be received, e.g. from said external device, for example via a wired or a wireless data transmission medium, e.g. over a (virtual) private computer network and/or a public computer network such as e.g. the Internet. According to further preferred embodiments, the data carrier signal DCS may represent or carry the computer program PRG according to the embodiments, or at least a part thereof.

Further exemplary embodiments relate to a communications network 10, 20 (FIG. 2), for example time sensitive networking network and/or wireless communications network or system, comprising at least one apparatus 300 according to the embodiments.

Further exemplary embodiments, FIG. 13, relate to a use 400 of the method according to the embodiments and/or of the apparatus 300 according to the embodiments and/or of the computer program PRG according to the embodiments and/or of the computer-readable storage medium SM according to the embodiments and/or of the data carrier signal DCS according to the embodiments and/or of the communications network 10, 20 according to the embodiments for at least one of: a) reducing 401, for example minimizing, an amount of overprovisioned resources, for example for transmission of the data streams ds, b) increasing 402 a number of, for example time critical, data streams which can be supported, for example by the wireless communications network 20, c) scheduling 403 resources for at least two data streams based on a correlation between respective radio channels associated with a respective one of the at least two data streams, d) optimizing 404 a first schedule sched-1, for example an offline pre-schedule, for transmitting data streams ds, for example using a time sensitive networking, TSN, network 10 and/or a wireless communications system 20, for example a joint TSN and wireless communications system 10, 20, e) increasing 405 a reliability for transmission of the data streams ds, for example in a system 20 with limited share resources 20-res, f) minimizing 406 required resources to achieve a predetermined reliability target, g) determining 407 a reliable, e.g. the most reliable, schedule for a transmission of the data streams, for example under a resource constraint, h) avoiding 408 to assign resources for a transmission of the data streams on a per-stream basis, i) assigning 409 resources for a transmission of the data streams ds based on groups of the data streams, for example optimizing the groups of the data streams such that a channel correlation of radio channels associated with the data streams is minimized between all data streams using a same set of resources, for example same time resources, for example a same time window.

Some exemplary embodiments may achieve higher gains, the stronger the correlation between devices or endpoints (and/or their respective radio channels) in the network 20.

In some exemplary embodiments, multiple data streams s may be transmitted over a same device d. In some embodiments, this may e.g. be the case when a 5G device acts as a wireless gateway behind which a TSN bridge E3 (FIG. 3) with multiple endpoints (not shown) is connected. In some embodiments, from a TSN perspective, it may be advantageous to aggregate the multiple data streams to the same TSN bridge E3 in one cycle, as it reduces forwarding complexity. However, in this case all of the multiple streams have maximum correlation (as it is the same target device). Any channel dynamics affects all streams simultaneously. By contrast, in some embodiments, by avoiding large bursts and transmitting frames spread over different time windows, e.g. using the principle according to the embodiments, better reliability can be achieved. In some embodiments, this may reduce a probability of an outage, e.g. where an instantaneous resource demand of a burst of data streams exceeds the available resource within the transmission deadline of the streams.

What is claimed is:

1. A computer implemented method of processing data related to a transmission of a plurality of data streams over a wireless communications system, comprising:
    determining requirements of at least two data streams of the plurality of data streams;
    determining a resource demand characterizing transmission resources of the wireless communications system based on the requirements of the at least two data streams;
    scheduling resources for the at least two data streams based on the resource demand and a correlation between respective radio channels associated with a respective one of the at least two data streams;
    determining whether the correlation between respective radio channels associated with a respective one of the at least two data streams exceeds a first threshold; and
    based on determining the correlation between respective radio channels associated with a respective one of the at least two data streams exceeds the first threshold, assigning different time resources to the at least two data streams.

2. The method according to claim 1, wherein the data streams are data streams of a time sensitive networking network.

3. The method according to claim 1, further comprising:
    determining the correlation between the respective radio channels based on a) a respective channel model for the respective radio channels, and/or b) a position of devices associated with the at least two data streams.

4. The method according to claim 3, further comprising:
W
    using the correlation for the scheduling.

5. The method according to claim 1, further comprising:
    determining requirements of the plurality of data streams;
    determining a resource demand characterizing transmission resources of the wireless communications system based on the requirements of the plurality of data streams;
    determining a channel model for each of the plurality of data streams, and a correlation between the respective radio channels associated with a respective one of the plurality of data streams, based on the channel models; and
    scheduling resources for the plurality of data streams based on the resource demand and the correlation.

6. The method according to claim 5, further comprising:
    determining transmission time windows based on the requirements.

7. The method according to claim 5, wherein the resource demand characterizes different channel states of respective radio channels associated with a respective one of the plurality of data streams.

8. The method according to claim 5, wherein the scheduling includes optimizing an assignment of time resources to the plurality of data streams such that a number of required resources for a set of streams assigned to a same time resource is minimized.

9. The method according to claim 5, wherein the scheduling includes minimizing a correlation between at least two of the data streams assigned to a same time resource and/or between their associated radio channels.

10. The method according to claim 1, further comprising:
providing a first schedule for the transmission of the at least two data streams of the plurality of data streams based on the scheduled resources.

11. The method according to claim 10, further comprising:
providing a second schedule for the transmission of the at least two data streams of the plurality of data streams based on the first schedule and based on channel measurements associated with at least one of the respective radio channels associated with a respective one of the at least two data streams.

12. The method according to claim 10, further comprising:
providing the first schedule to the wireless communications system and/or to an element of the wireless communications system;
receiving feedback from the wireless communications system and/or the element of the wireless communications system on the first schedule;
modifying at least one of the first schedule and a second schedule based on the feedback.

13. The method according to claim 10, wherein the at least two data streams are of a time sensitive networking (TSN) network, and further comprising providing feedback on the first schedule.

14. The method according to claim 1, wherein the method is used for at least one of the following: a) minimizing an amount of overprovisioned resources for the transmission of the data streams, b) increasing a number of time critical data streams which can be supported, by the wireless communications system, c) scheduling the resources for the at least two data streams based on a correlation between respective radio channels associated with a respective one of the at least two data streams, d) optimizing a first schedule for transmitting data streams, e) increasing a reliability for transmission of the data streams in a system with limited share resources, f) minimizing required resources to achieve a predetermined reliability target, g) determining a reliable schedule for the transmission of the data streams under a resource constraint, h) avoiding assigning resources for a transmission of the data streams on a per-stream basis, i) assigning resources for a transmission of the data streams based on groups of the data streams, optimizing the groups of the data streams such that a channel correlation of radio channels associated with the data streams is minimized between all data streams using a same set of resources.

15. The method according to claim 1, wherein the requirements of the at least two data streams comprise at least one of a cycle time, a reliability target, a packet error tolerance, a latency, a jitter, and a packet size.

16. An apparatus comprising a processor, the processor configured to process data related to a transmission of a plurality of data streams over a wireless communications system, the apparatus processor further configured to:
determine requirements of at least two data streams of the plurality of data streams;
determine a resource demand characterizing transmission resources of the wireless communications system based on the requirements of the at least two data streams;
schedule resources for the at least two data streams based on the resource demand and a correlation between respective radio channels associated with a respective one of the at least two data streams;
determine whether the correlation between respective radio channels associated with a respective one of the at least two data streams exceeds a first threshold; and
based on determining the correlation between respective radio channels associated with a respective one of the at least two data streams exceeds the first threshold, assign different time resources to the at least two data streams.

17. A non-transitory computer-readable storage medium on which is stored a computer program for processing data related to a transmission of a plurality of data streams over a wireless communications system, the computer program, when executed by a computer, causing the computer to perform:
determining requirements of at least two data streams of the plurality of data streams;
determining a resource demand characterizing transmission resources of the wireless communications system based on the requirements of the at least two data streams;
scheduling resources for the at least two data streams based on the resource demand and a correlation between respective radio channels associated with a respective one of the at least two data streams;
determining whether the correlation between respective radio channels associated with a respective one of the at least two data streams exceeds a first threshold; and
based on determining the correlation between respective radio channels associated with a respective one of the at least two data streams exceeds the first threshold, assigning different time resources to the at least two data streams.

18. A communications network, comprising:
at least one apparatus comprising a processor, the processor configured to process data related to a transmission of a plurality of data streams over the communications system, the processor further configured to:
determine requirements of at least two data streams of the plurality of data streams;
determine a resource demand characterizing transmission resources of the wireless communications system based on the requirements of the at least two data streams;
schedule resources for the at least two data streams based on the resource demand and a correlation between respective radio channels associated with a respective one of the at least two data streams
determine whether the correlation between respective radio channels associated with a respective one of the at least two data streams exceeds a first threshold; and
based on determining the correlation between respective radio channels associated with a respective one of the at least two data streams exceeds the first threshold, assign different time resources to the at least two data streams.

19. The communications network according to claim 18, wherein the communications network is a time sensitive networking (TSN) network or a wireless communication system.

* * * * *